(12) United States Patent
Yamamoto

(10) Patent No.: US 12,340,562 B2
(45) Date of Patent: Jun. 24, 2025

(54) COMPUTER-READABLE RECORDING MEDIUM STORING INFORMATION PROCESSING PROGRAM, METHOD OF PROCESSING INFORMATION, AND INFORMATION PROCESSING APPARATUS

(71) Applicant: Fujitsu Limited, Kawasaki (JP)

(72) Inventor: Takuma Yamamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 17/964,348

(22) Filed: Oct. 12, 2022

(65) Prior Publication Data

US 2023/0230357 A1 Jul. 20, 2023

(30) Foreign Application Priority Data

Jan. 14, 2022 (JP) ................... 2022-004438

(51) Int. Cl.
| | | |
|---|---|---|
| *G06V 20/70* | (2022.01) | |
| *G06V 10/72* | (2022.01) | |
| *G06V 10/75* | (2022.01) | |
| *G06V 10/77* | (2022.01) | |
| *G06V 10/82* | (2022.01) | |
| *G06V 20/50* | (2022.01) | |

(52) U.S. Cl.
CPC .......... *G06V 10/7715* (2022.01); *G06V 10/72* (2022.01); *G06V 10/751* (2022.01)

(58) Field of Classification Search
CPC .. G06V 10/7715; G06V 10/72; G06V 10/751; G06V 20/70; G06V 10/82; G06V 20/50
See application file for complete search history.

(56) References Cited

U.S. PATENT DOCUMENTS

| | | | |
|---|---|---|---|
| 10,304,009 B1 * | 5/2019 | Kim ................. | G06N 3/045 |
| 2018/0268250 A1 * | 9/2018 | Drozdova .......... | G06V 10/82 |

(Continued)

FOREIGN PATENT DOCUMENTS

CN 108399366 A * 8/2018

OTHER PUBLICATIONS

Danfei Xu et al., "Scene Graph Generation by Iterative Message Passing", Proceedings of the IEEE Conference on Computer Vision and Pattern Recognition, pp. 1-10, 2017 (Total 10 pages).

(Continued)

*Primary Examiner* — John Villecco
*Assistant Examiner* — Kyla Guan-Ping Tiao Allen
(74) *Attorney, Agent, or Firm* — Fujitsu Intellectual Property Center

(57) ABSTRACT

A non-transitory computer-readable recording medium stores an information processing program for causing a computer to execute a process including: extracting a first feature from an image; detecting, from the extracted first feature, a plurality of visual entities included in the image; generating a second feature in which the visual entities in at least one combination of the plurality of detected visual entities are combined, in first feature, with each other; generating, based on the first feature and the second feature, a first map that indicates relation of each visual entity; extracting a fourth feature based on the first map and a third feature obtained by converting the first feature; and estimating the relation from the fourth feature.

16 Claims, 15 Drawing Sheets

(56) References Cited

U.S. PATENT DOCUMENTS

| | | | |
|---|---|---|---|
| 2019/0156144 A1* | 5/2019 | Li | G06F 18/253 |
| 2021/0103733 A1* | 4/2021 | Jiang | G06N 3/08 |
| 2022/0101556 A1* | 3/2022 | Zhang | G06V 20/52 |
| 2022/0156944 A1* | 5/2022 | Zhang | G06T 7/20 |
| 2022/0207868 A1* | 6/2022 | Zhang | G01S 7/417 |
| 2024/0005628 A1* | 1/2024 | Cai | G06V 10/454 |

OTHER PUBLICATIONS

Rongjie Li et al., "Bipartite Graph Network with Adaptive Message Passing for Unbiased Scene Graph Generation", The Computer Vision Foundation, Proceedings of the IEEE/CVF Conference on Computer Vision and Pattern Recognition, pp. 11109-11119, 2021 (Total 11 pages).

* cited by examiner

PAIR FEATURE

COMPUTER-READABLE RECORDING MEDIUM STORING INFORMATION PROCESSING PROGRAM, METHOD OF PROCESSING INFORMATION, AND INFORMATION PROCESSING APPARATUS

CROSS-REFERENCE TO RELATED APPLICATION

This application is based upon and claims the benefit of priority of the prior Japanese Patent Application No. 2022-4438, filed on Jan. 14, 2022, the entire contents of which are incorporated herein by reference.

FIELD

The embodiments discussed herein are related to a computer-readable recording medium storing an information processing program, a method of processing information, and an information processing apparatus.

BACKGROUND

A technique to realize a secure and safe society by sensing the real world from a video and feeding back the obtained knowledge has been developed. According to this technique, in order to deeply understand the complex real world, for example, to sense the complex real world, only detecting a person or a visual entity as in the related art is insufficient. In addition, it is desired to recognize relation (also referred to as "context") between persons or visual entities in the video.

Li, Rongjie, et al., "Bipartite Graph Network with Adaptive Message Passing for Unbiased Scene Graph Generation." Proceedings of the IEEE/CVF Conference on Computer Vision and Pattern Recognition, 2021 and Xu, Danfei, et al., "Scene graph generation by iterative message passing." Proceedings of the IEEE conference on computer vision and pattern recognition, 2017 are disclosed as related art.

SUMMARY

According to an aspect of the embodiments, a non-transitory computer-readable recording medium stores an information processing program for causing a computer to execute a process including: extracting a first feature from an image; detecting, from the extracted first feature, a plurality of visual entities included in the image; generating a second feature in which the visual entities in at least one combination of the plurality of detected visual entities are combined, in first feature, with each other; generating, based on the first feature and the second feature, a first map that indicates relation of each visual entity; extracting a fourth feature based on the first map and a third feature obtained by converting the first feature; and estimating the relation from the fourth feature.

The visual entity and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

With the related-art visual entity detection technique to detect a person and a visual entity, in some cases semantically different scenes are detected as the same result because of lack of a large amount of information such as an act of a person or the relation between a person and a visual entity even when the detection is correctly performed. Thus, for example, in analysis of a monitoring and watching system or the like, there is a possibility of incorrect recognition such as recognition in which a situation is recognized as dangerous although it is not dangerous, and vice versa.

Accordingly, in order to deeply sense and understand the real world, a scene graph that represents the relation between visual entities including a person in an image with graphs is generated. Scene graph generation refers to detection of the locations of the visual entities (bounding boxes: BBOXes) and types of the visual entities (classes) in an image (scene) and generation of a scene graph corresponding to these.

However, in the related-art scene graph generation, since individual visual entities are cropped from an image, contextually important information existing in regions other than the BBOX regions of the cropped visual entities may be missed. For example, there may be a case where the relation between the cropped visual entities is understood more by viewing visual entities around the BBOX regions of the cropped visual entities and the entirety of the image. For example, the relation between the visual entities is not necessarily correctly recognized only with the information on the BBOX regions of the cropped visual entities.

In one aspect, it is an visual entity to provide an information processing program, an information processing method, and an information processing apparatus that may more accurately recognize the relation between visual entities in an image.

Hereinafter, embodiments of an information processing program, a method of processing information, and an information processing apparatus according to an embodiment will be described in detail with reference to the drawings. The embodiments do not limit the present embodiment. Each of the embodiments may be combined with an other embodiment as appropriate as long as they do not contradict each other.

Embodiment 1

Figure 1:
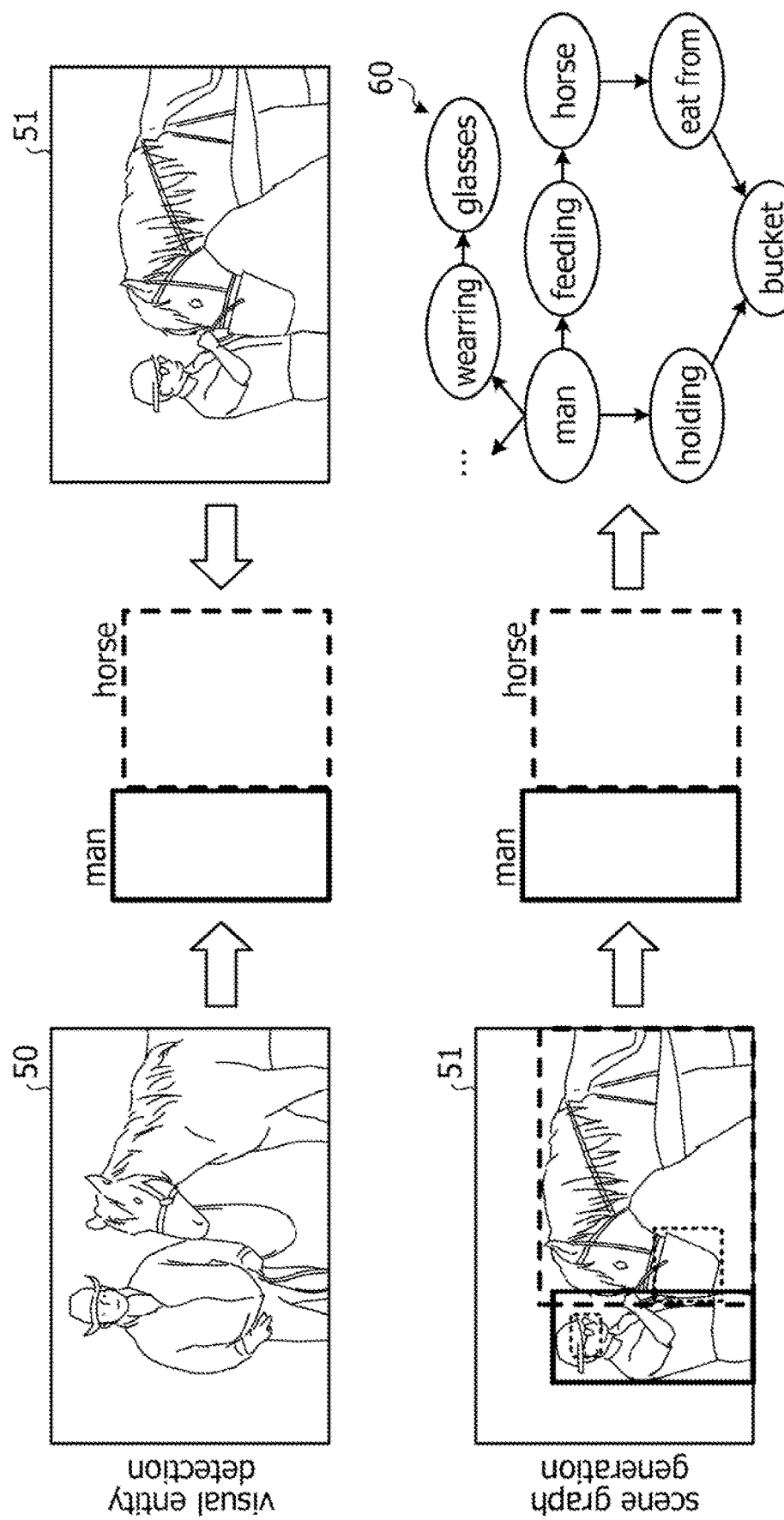
FIG. 1 is a diagram for explaining visual entity detection and scene graph generation.

First, with reference to FIG. 1, related art of visual entity detection and scene graph generation from captured images to be executed by an information processing apparatus is described. FIG. 1 is a diagram for explaining the visual entity detection and the scene graph generation. In FIG. 1, the visual entity detection is illustrated in an upper part and the scene graph generation is illustrated in a lower part.

As illustrated in the upper part of FIG. 1, a visual entity including a person is detected from captured images by using an existing detection algorithm such as you only look once (YOLO), a single shot multibox detector (SSD), or region based convolutional neural networks (R-CNN). In an example illustrated in FIG. 1, at least a man and a horse are detected from a captured image 50 or 51, and detected visual entities are indicated by bounding boxes (BBOXes) that enclose regions of the visual entities with a rectangular shape in the image. However, although the captured images 50 and 51 are images obtained by capturing different scenes, similar detection results may be obtained only by the visual entity detection, and it may be said that the detection results are not sufficient.

Accordingly, as illustrated in the lower part of FIG. 1, a scene graph that also represents the relation between a human and a visual entity is generated from the captured image. A lower part of FIG. 1 illustrates an example in which a scene graph 60 is generated from the captured image 51. In the scene graph of the example illustrated in FIG. 1, in addition to the visual entities represented by the man and the horse, the relation between visual entities represented by wearing, feeding, and so force is also represented in the example of FIG. 1.

Figure 2:
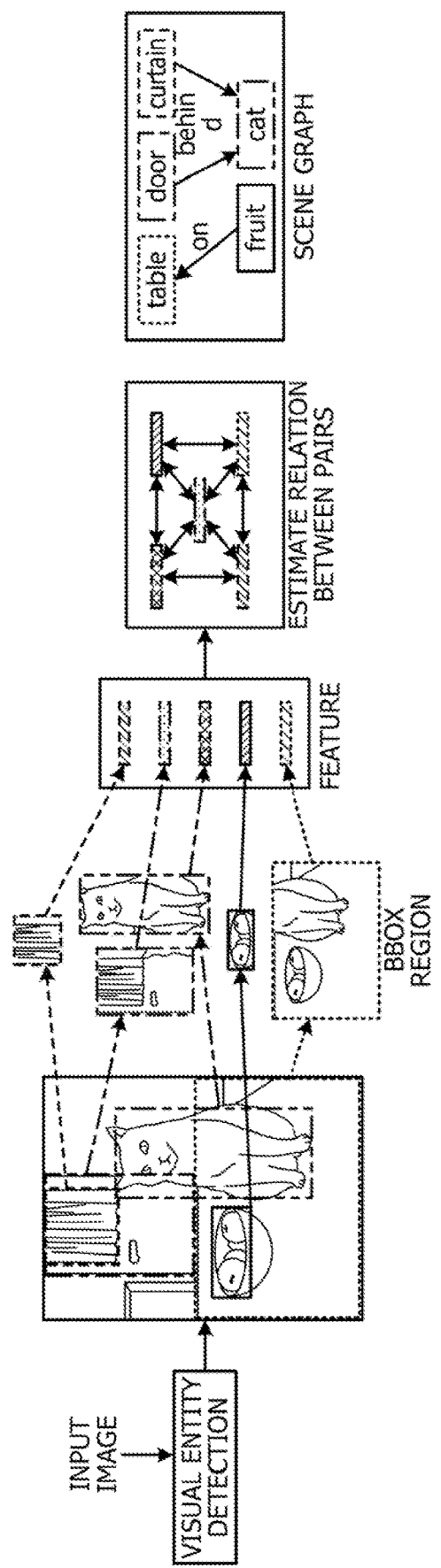
FIG. 2 is a diagram illustrating an example of a scene graph generation process.

The scene graph is generated by using the existing technique described in "Bipartite Graph Network with Adaptive Message Passing for Unbiased Scene Graph Generation", "Scene graph generation by iterative message passing", or the like. FIG. 2 is a diagram illustrating an example of a scene graph generation process. As illustrated in FIG. 2, the information processing apparatus detects, by using the existing detection algorithm, all visual entities including a person from an input captured image and generates, for each of the detected visual entities, a BBOX that surrounds the visual entity in the image. Next, the information processing apparatus cuts out BBOX regions from the image and extracts the feature of each region. The information processing apparatus estimates the relation from the feature of pairs of visual entities (a subject and an object) and generates a scene graph representing the visual entities and the relation, for example, context therebetween.

Figure 3:
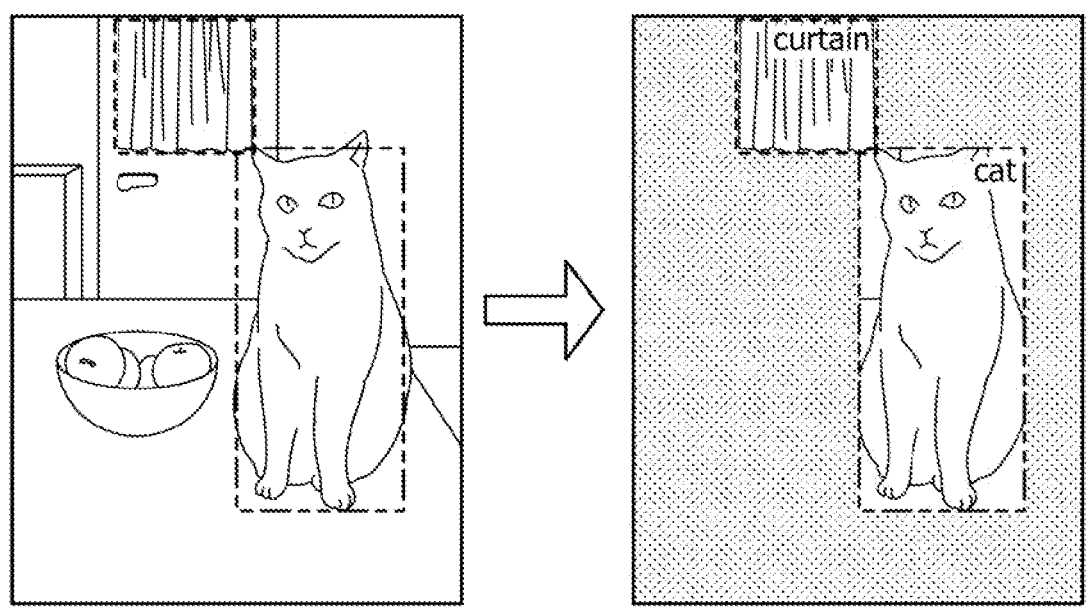
FIG. 3 is a diagram for explaining a problem with scene graph generation.

FIG. 3 is a diagram for explaining a problem with scene graph generation. In the scene graph generation, as illustrated in FIG. 3, since individual visual entities are cropped from a captured image, contextually important information existing at regions other than the BBOX regions of the subject and the object may be missed. For example, although BBOX regions of a cat and a curtain are cropped as illustrated on the right part in an example illustrated in FIG. 3, information in the other regions than the BBOX regions is not used to estimate the relation between the cat and the curtain. Thus, even when there is important information for the estimation, the important information is missed. For example, it may be estimated that the curtain is present behind the cat by looking visual entities around the cat and the curtain and the structure of the room. However, in the scene graph generation of related art, information on surroundings is not used to estimate the relation between the cat and the curtain. When the surrounding information is also used to estimate the relation between visual entities, for example, it may be estimated, from the image on the left part of FIG. 3, that apples are present beside the cat, there is a high possibility that a table is present under the cat and the apples, the curtain is present behind the cat because the curtain is hung on a door, and so forth.

Thus, according to the present embodiment, a contextually important regions are adaptively extracted from the entirety of an image for each subject and each object that are targets of relation estimation to recognize the relation of the targets. A region important for the recognition of the relation is realized, for example, as a map having a value from 0 to 1 in accordance with the importance (hereafter, referred to as an "attention map").

Figure 4:
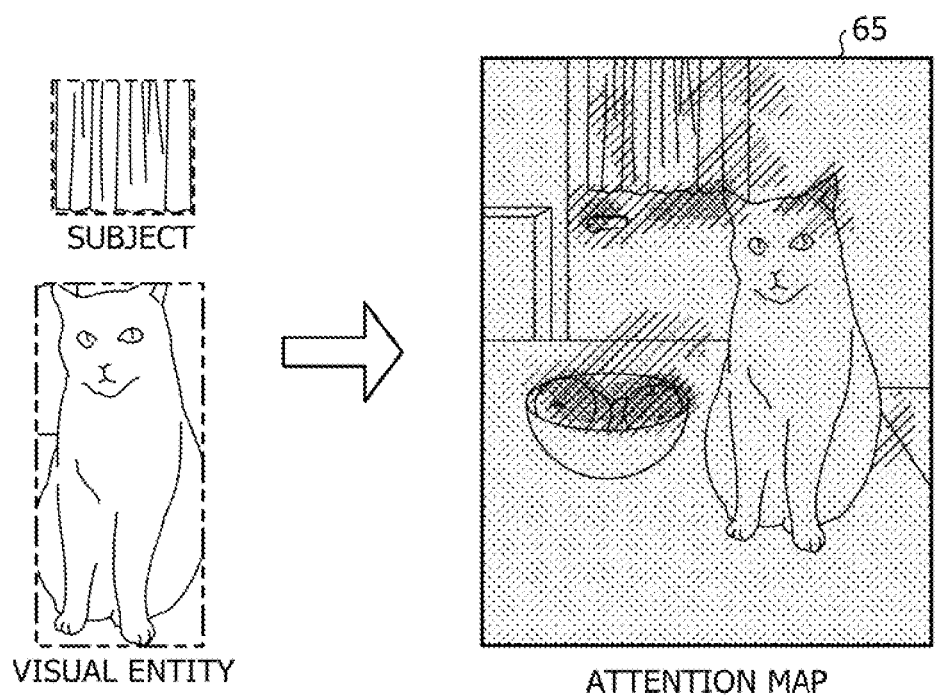
FIG. 4 is a diagram illustrating an example of attention map generation according to Embodiment 1.

FIG. 4 is a diagram illustrating an example of attention map generation according to Embodiment 1. As illustrated in FIG. 4, in addition to cutting out only the BBOX regions as in the scene graph generation of related art, an attention map 65 that represents important regions other than the subject and object regions which are the targets for the relation estimation is generated and used to estimate the relation between the visual entities. As illustrated in FIG. 4, the attention map 65 represents the degree of importance of the regions important for estimating the relation between the subject and the object by using color, light and shade, or the like. To increase a recognition rate of the relation between visual entities, the attention map 65 is generated by, for example, using a machine learning model trained and generated so that the feature of visual entities detected from an image is input and an important region in the image is output as a correct answer label. Since a position at which the contextually important region is present in an image is not necessarily known in advance, the attention map 65 is generated for the entirety of the image. Accordingly, the important region may be extracted more accurately, and further, the relation between the visual entities may be recognized more accurately.

[Functional Configuration of Information Processing Apparatus 10]

Figure 5:
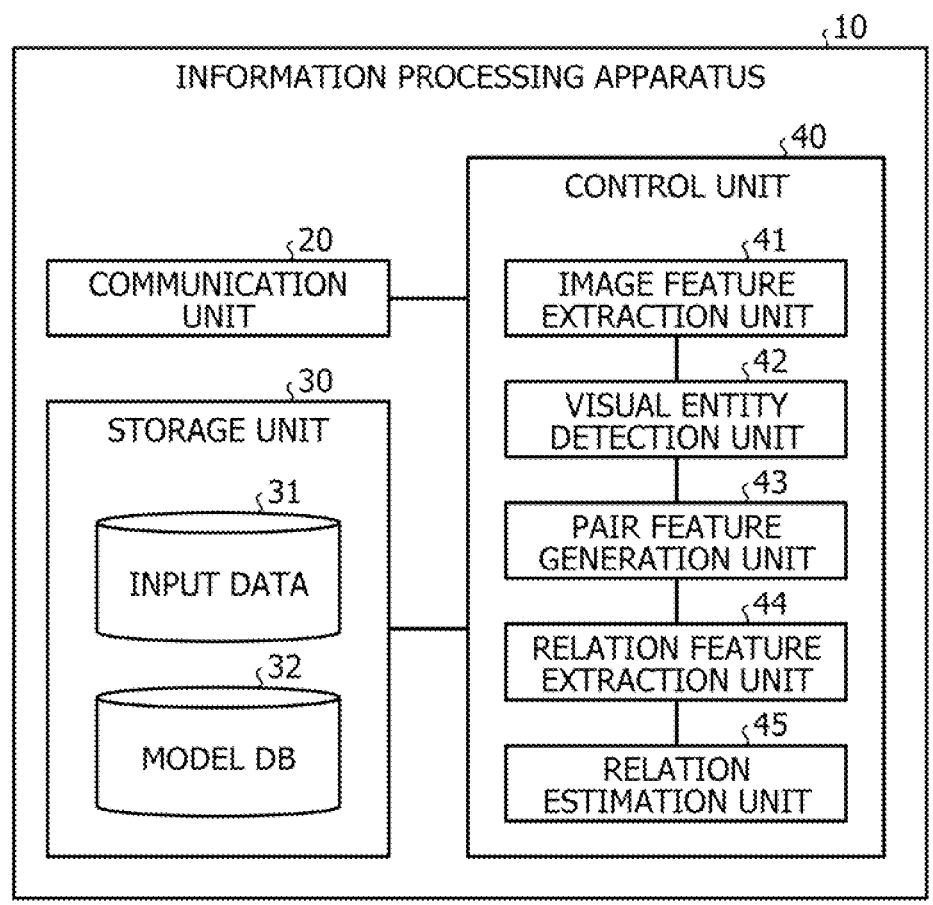
FIG. 5 is a diagram illustrating a configuration example of an information processing apparatus according to Embodiment 1.

Next, a functional configuration of an information processing apparatus 10 serving as an execution subject according to the present embodiment is described. FIG. 5 is a diagram illustrating a configuration example of the information processing apparatus 10 according to Embodiment 1. As illustrated in FIG. 5, the information processing apparatus 10 includes a communication unit 20, a storage unit 30, and a control unit 40.

The communication unit 20 is a processing unit that controls communication with an other information processing apparatus and is, for example, a communication interface such as a network interface card. The communication unit 20 may receive, for example, a captured image that is a recognition target of the relation between visual entities from a camera device or an other information processing apparatus.

The storage unit 30 is an example of a storage device that stores various types of data and a program to be executed by the control unit 40, and is, for example, a memory, a hard disk drive, or the like. The storage unit 30 stores input data 31, a model database (DB) 32, and the like.

The input data 31 stores data to be input to the information processing apparatus 10 for recognition of the relation between visual entities. The data is, for example, an image or video obtained by capturing a certain scene. The data may be uploaded from an other information processing apparatus to the information processing apparatus 10 via the communication unit 20 or read by the information processing apparatus 10 via arbitrary computer-readable recording medium.

The model DB 32 stores, for example, information on a machine learning model for obtaining types of visual entities (classes) and a relation between the visual entities (relation) for generating a scene graph from a captured image. The model DB 32 also stores a model parameter for constructing a machine learning model. The machine learning model, for example, a scene graph generation model is generated by machine learning by using the captured image as the feature and the locations of the visual entities (BBOXes), the types of the visual entities (classes), and the relation between the visual entities (relation) included in the captured image as correct answer labels.

The model DB 32 stores, for example, the information on the machine learning model trained and generated so that the feature of the visual entities detected from the image is input and the important region in the image is output as the correct answer label. The model DB 32 also stores the model parameter of the machine learning model. The machine learning model is a model for generating the attention map and referred to as an attention map generation model. The scene graph generation model and the attention map generation model may be generated by the information processing apparatus 10 or may be trained and generated by an other information processing apparatus.

The above-described information stored in the storage unit 30 is merely exemplary, and the storage unit 30 may store various types of information other than the above-described information.

The control unit 40 is a processing unit that controls the entirety of the information processing apparatus 10 and is, for example, a processor or the like. The control unit 40 includes an image feature extraction unit 41, a visual entity detection unit 42, a pair feature generation unit 43, a relation feature extraction unit 44, and a relation estimation unit 45. Each of the processing units is an example of an electronic circuit included in the processor or an example of a process executed by the processor.

The image feature extraction unit 41 extracts a first feature from the image.

The visual entity detection unit 42 detects a plurality of visual entities included in the image from the first feature extracted by the image feature extraction unit 41.

As a pair feature, the pair feature generation unit 43 generates a second feature in which the visual entities in combinations of the plurality of visual entities detected by the visual entity detection unit 42 are combined, in first feature, with each other. A process of generating the second feature includes a process of generating the second feature in which the visual entities in each of the combinations of the plurality of detected visual entities are respectively defined as a subject and an object, and the visual entities in the combination of the subject and the object are combined, in first feature, with each other.

Based on the first feature and the second feature, the relation feature extraction unit 44 generates a first map indicating the relation of each visual entity, for example, the attention map. A process of generating the first map includes a process of obtaining correlation between the first feature and the second feature for each of the combinations of the plurality of detected visual entities and generating the first map based on the correlation.

The relation estimation unit 45 extracts a fourth feature based on a third feature obtained by converting a first feature and a first map and estimates the relation of each visual entity from the fourth feature. For example, the fourth feature is a feature of a region represented as a region important for recognizing the relation of each visual entity in the attention map. A process of extracting the fourth feature includes a process of obtaining a weighted sum by multiplying the third feature by the first map and extracting the fourth feature based on the weighted sum.

The relation estimation unit 45 generates a fifth feature based on the fourth feature and the second feature and estimates the relation of each visual entity from the fifth feature. A process of estimating the relation includes a process of generating the fifth feature by synthesizing the fourth feature and the second feature, calculating the probability of the type of the relation of each visual entity from the fifth feature, and estimating the relation of each visual entity based on the probability. For example, the relation estimation unit 45 estimates the type of relation (on, behind, hold, or the like) having the highest probability out of a plurality of probabilities calculated for each set of the visual entities as the relation for the set of the visual entities.

Details of Functions

With reference to FIGS. 6 to 11, a relation estimation process that may more accurately recognize the relation between visual entities in an image is described in more detail. Each processing unit that executes the relation estimation process according to the present embodiment may be configured by a neural network (NN).

Figure 6:
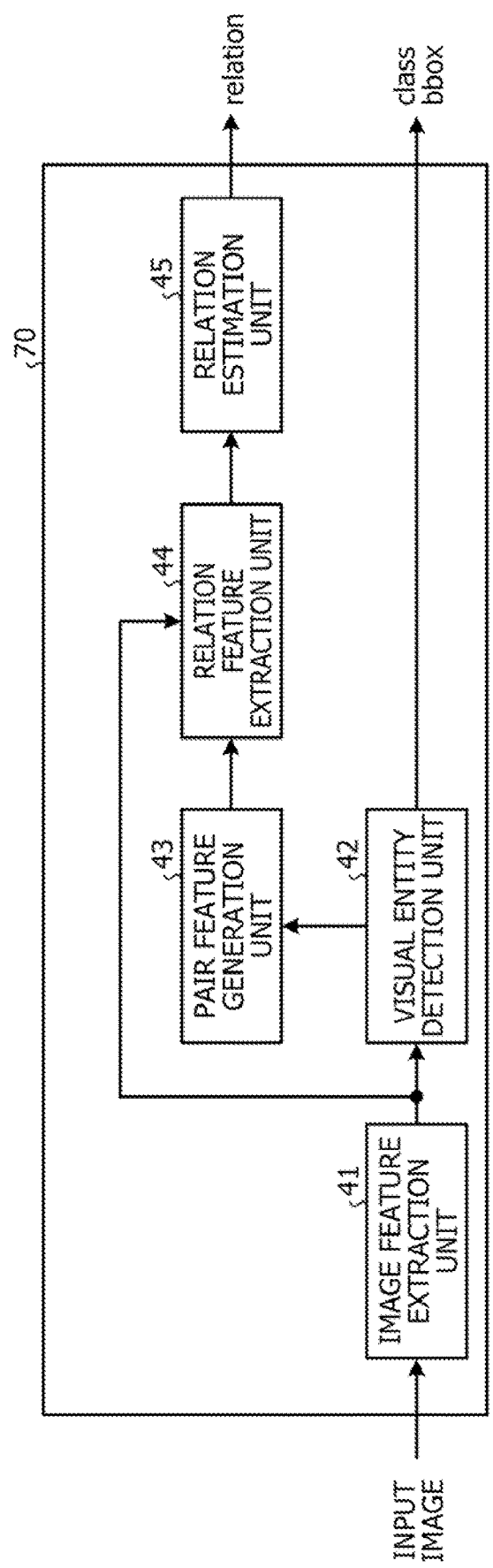
FIG. 6 is a diagram illustrating an example of a neural network (NN) configuration according to Embodiment 1.

FIG. 6 is a diagram illustrating an example of an NN configuration according to Embodiment 1. As illustrated in FIG. 6, the image feature extraction unit 41, the visual entity detection unit 42, the pair feature generation unit 43, the relation feature extraction unit 44, and the relation estimation unit 45 that execute the relation estimation process according to the present embodiment may be configured by an NN 70. When an image obtained by capturing a certain scene is input, the NN 70 executes from a process performed by the image feature extraction unit 41 and outputs the BBOXes and the types (classes) of the visual entities detected by the visual entity detection unit 42. The NN 70 also outputs the relation of each visual entity (relation) having been detected by the visual entity detection unit 42. Here, the relation is estimated by the relation estimation unit 45. Next, processes performed by the processing units included in NN 70 is described below on a process-by-process basis.

Figure 7:
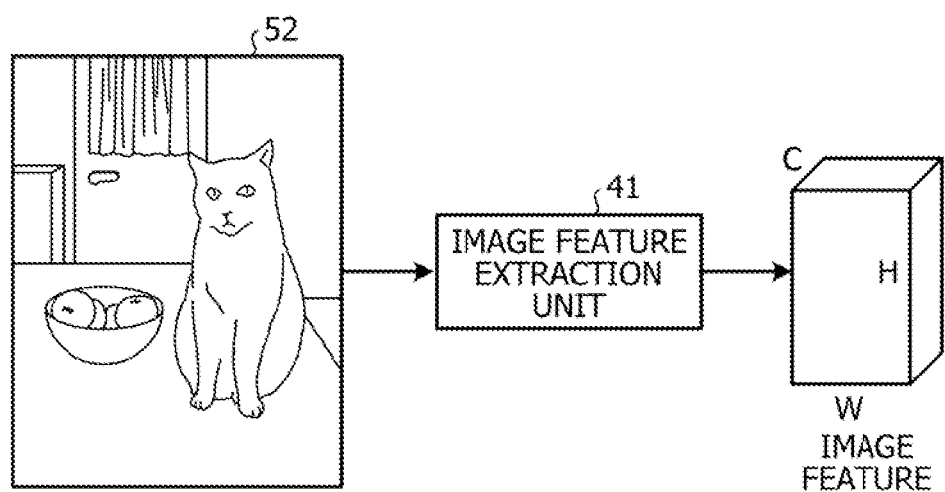
FIG. 7 is a diagram illustrating an example of image feature extraction according to Embodiment 1.

First, feature extraction from a captured image to be executed by the image feature extraction unit 41 is described. FIG. 7 is a diagram illustrating an example of image feature extraction according to Embodiment 1. As illustrated in FIG. 7, the image feature extraction unit 41 extracts, for example, the image feature of a C channel from a captured image 52 of an RGB three channels. The image feature extraction unit 41 may be configured by, for example, a convolutional neural network (CNN), a transformer, or an other existing technique. The CNN or transformer pretrained for a classification task or the like with a large-scale image dataset such as ImageNet may be used. A width W and a height H of the image feature are usually smaller than the width and height of an input image, for example, the captured image 52 in the example illustrated in FIG. 7 due to the CNN or pooling processing.

Figure 8:
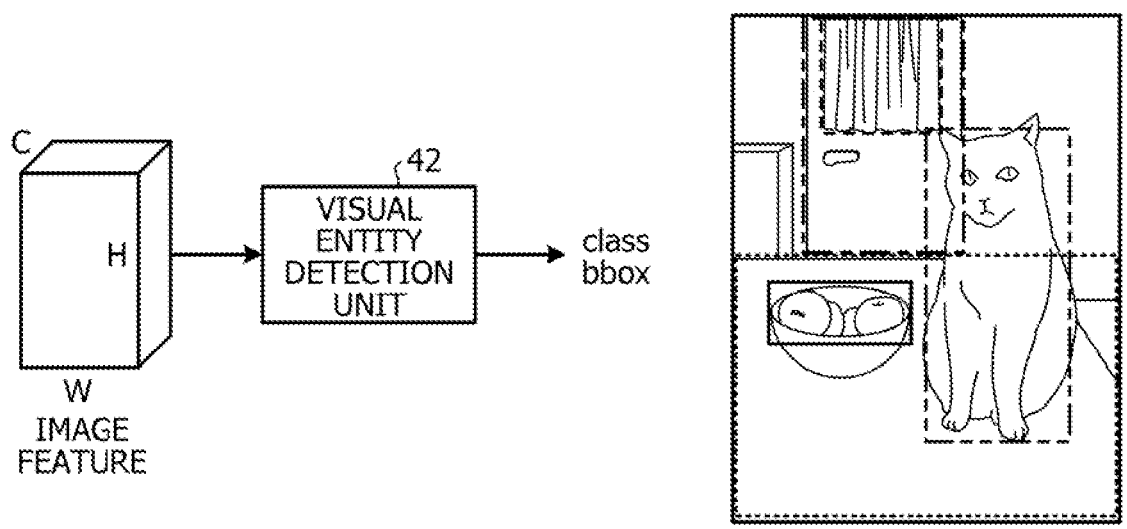
FIG. 8 is a diagram illustrating an example of the visual entity detection according to Embodiment 1.

Next, visual entity detection from the image feature to be executed by the visual entity detection unit 42 is described. FIG. 8 is a diagram illustrating an example of the visual entity detection according to Embodiment 1. As illustrated in FIG. 8, for example, the visual entity detection unit 42 receives the image feature extracted by the image feature extraction unit 41 and outputs the BBOX indicating the location of each visual entity included in the captured image with a rectangle surrounding the visual entity and class indicating the type of the visual entity. As an output example, the visual entity detection unit 42 may draw and output the BBOX of each of the detected visual entities so as to be superposed on the captured image, for example, as illustrated on the right side of FIG. 8. In so doing, the class indicating the type of the visual entity may be output near the BBOX.

For example, the rectangle of the BBOX may be represented by four real number values such as upper left coordinates (x1, y1) and lower right coordinates (x2, y2) of the rectangle. The class is the probability that the detected visual entity is each visual entity to serve as a predetermined detection target. For example, predetermined detection targets are {cat, table, car} and, as illustrated on the right side of FIG. 8, the class of the BBOX corresponding to the cat is probabilities such as (0.9, 0.1, 0.2). In this case, the class indicates that the probabilities of the detected visual entity being a cat, a table, and a car are 0.9, 0.1, and 0.2, respectively. The visual entity detection unit 42 may be configured by an NN for visual entity detection of the existing technique such as, for example, faster region based convolutional neural networks (R-CNN), mask R-CNN, or, a detection transformer (DETR).

Figure 9:
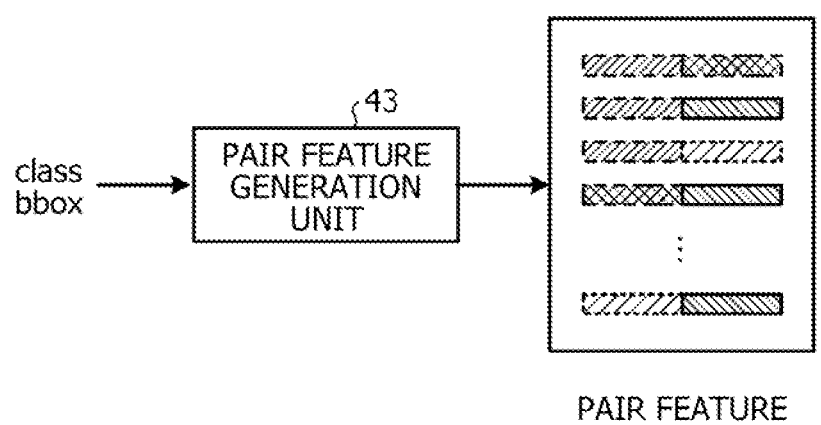
FIG. 9 is a diagram illustrating an example of pair feature generation according to Embodiment 1.

Next, the feature of a pair of the detected visual entities to be executed by the pair feature generation unit 43 is described. FIG. 9 is a diagram illustrating an example of pair feature generation according to Embodiment 1. As illustrated in FIG. 9, for example, the pair feature generation unit 43 extracts the feature of each of the detected visual entities on an visual entity-by-visual entity basis based on the visual entities detected by the visual entity detection unit 42, for example, the class and the BBOX that are output. In so doing, the pair feature generation unit 43 may use RoIAlign or the like in the Mask R-CNN. In a case where the visual entity detection unit 42 is configured by the DETR, the feature for each visual entity output by the Transformer decoder may be used as it is. The feature to be extracted may be, for example, a 256-dimensional or other real number vector for each visual entity.

The pair feature generation unit 43 performs pairing on the combinations of all the detected visual entities such that one of the visual entities is the subject and an other of the visual entities is the object. In the pair feature illustrated on the right side of FIG. 9, features of the subjects and the objects are arranged on a pair-by-pair basis. In order to adjust the number of dimensions of the pair feature, the pair feature generation unit 43 may convert the feature of the paired subject and object by using a multi layer perceptron (MLP), which is an existing technique.

Figure 10:
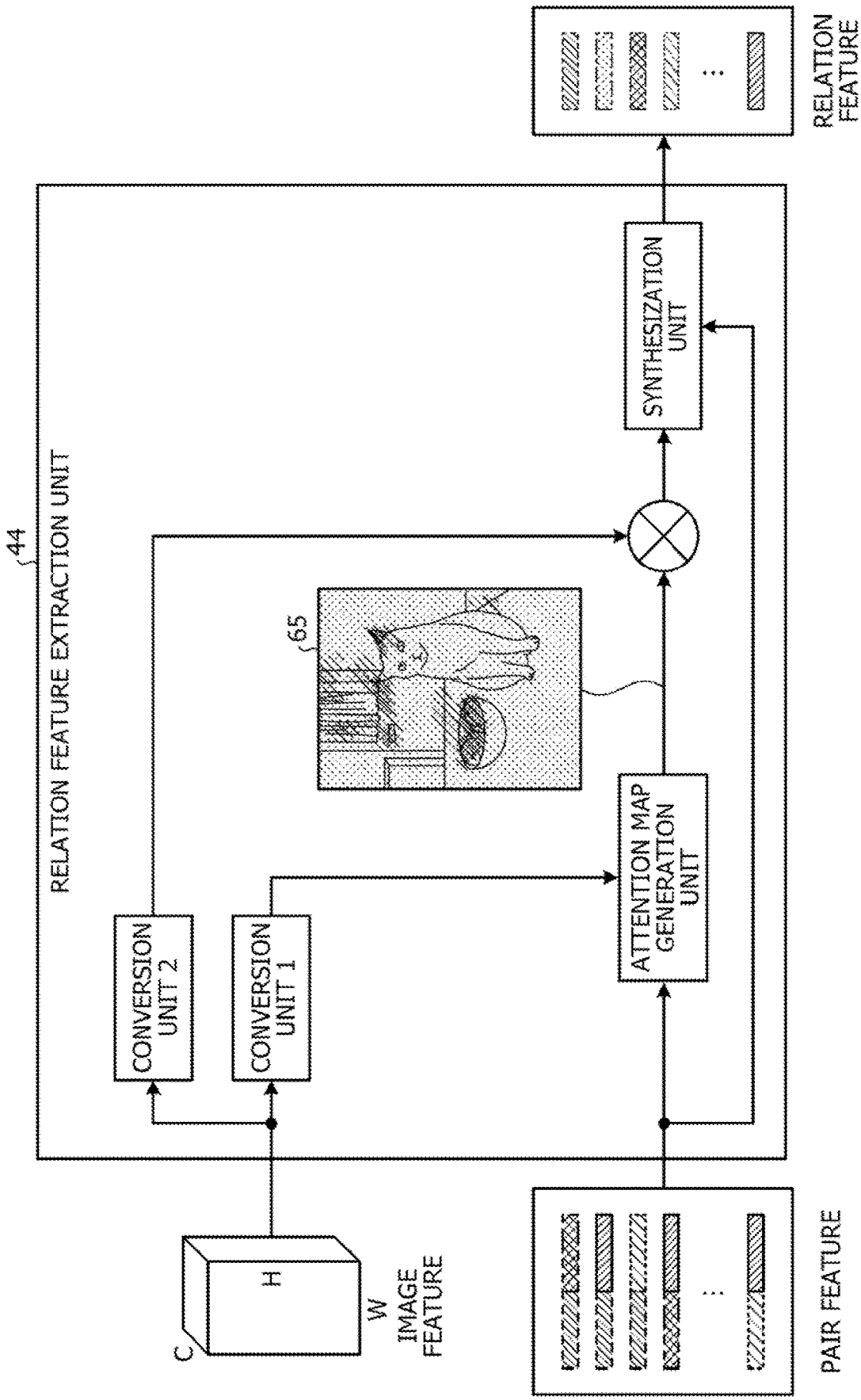
FIG. 10 is a diagram illustrating an example of relation feature extraction according to Embodiment 1.

Next, extraction of the feature indicating the relation of the detected and paired visual entities to be executed by the relation feature extraction unit 44 is described. FIG. 10 is a diagram illustrating an example of relation feature extraction according to Embodiment 1. First, as illustrated in FIG. 10, the relation feature extraction unit 44 converts, by using a conversion unit 1 and a conversion unit 2, image features extracted by the image feature extraction unit 41 for using the image feature in the following processing. The conversion unit 1 and the conversion unit 2 may be realized by, for example, a multilayer-perceptron (MLP) or the like. In the example illustrated in FIG. 10, since the conversion unit 1 and the conversion unit 2 are realized by the MLPs having different weights, the conversion units 1 and 2 are distinguished from each other.

Next, the relation feature extraction unit 44 generates, by using an attention map generation unit, an attention map by obtaining correlation with the image feature converted by the conversion unit 1 for each row of the pair feature generated by the pair feature generation unit 43, for example, for each pair of the subject and the object. After obtaining the correlation, the relation feature extraction unit 44 may convert the attention map by using the MLP and/or layer normalization.

A correlation process between a certain single pair feature and the image feature converted by the conversion unit 1 is described more specifically. It is assumed that the pair feature is adjusted to a C-dimensional vector in the process in the previous stage. It is also assumed that the image feature converted by the conversion unit 1 is a tensor of H×W and the channel direction of which is C dimensions. It is also assumed that a certain pixel (x, y) of the image feature converted by the conversion unit 1 is of interest, and this pixel is referred to as a pixel of interest. Since the pixel of interest is a 1×1×C, it may be regarded as a C-dimensional vector. The attention map generation unit calculates a correlation value (scalar) by obtaining correlation between the C-dimensional vector of the pixel of interest and the pair feature adjusted to the C-dimensional vector. Thus, the correlation value at the pixel of interest (x, y) is determined. The attention map generation unit executes this process for all the pixels to generate an attention map of H×W×1.

The relation feature extraction unit 44 multiplies the image feature converted by the conversion unit 2 by the generated attention map and obtains a weighted sum, thereby extracting the feature of an important region in the entirety of the image corresponding to the pair of the subject and the object. Since the weighted sum is obtained for the entirety of the image, the feature used to obtain the weighted sum is a C-dimensional feature for a single pair of the subject and the object.

The weighted sum of the attention map and the image feature converted by the conversion unit 2 is described more specifically. It is assumed that the image feature converted by the conversion unit 2 is a tensor of H×W×C. First, the relation feature extraction unit 44 multiplies the image feature converted by the conversion unit 2 by the attention map. In so doing, since the attention map is a H×W×1, the channel is copied to the C dimension. The relation feature extraction unit 44 adds all the C-dimensional vectors of the pixels for the multiplication results. As a result, a single C-dimensional vector is generated. For example, a single C-dimensional vector is generated per attention map. Since the number of the actually generated attention maps is the number of the pair features, the number of the C-dimensional vectors to be created is also the number of the pair features. By the above-described processing, the relation feature extraction unit 44 obtains the weighted sum using the attention map as the weight for the image feature converted by the conversion unit 2.

The relation feature extraction unit 44 synthesizes the feature of the extracted important region and the pair feature generated by the pair feature generation unit 43 by using a synthesization unit and outputs the result as a relation feature. For example, the relation feature extraction unit 44 may use the feature obtained by coupling the feature of the important region and the pair feature to each other in a dimensional direction. After coupling the feature of the important region and the pair feature, the relation feature extraction unit 44 may convert the coupled feature by using the MLP or the like in order to adjust the number of dimensions.

Figure 11:
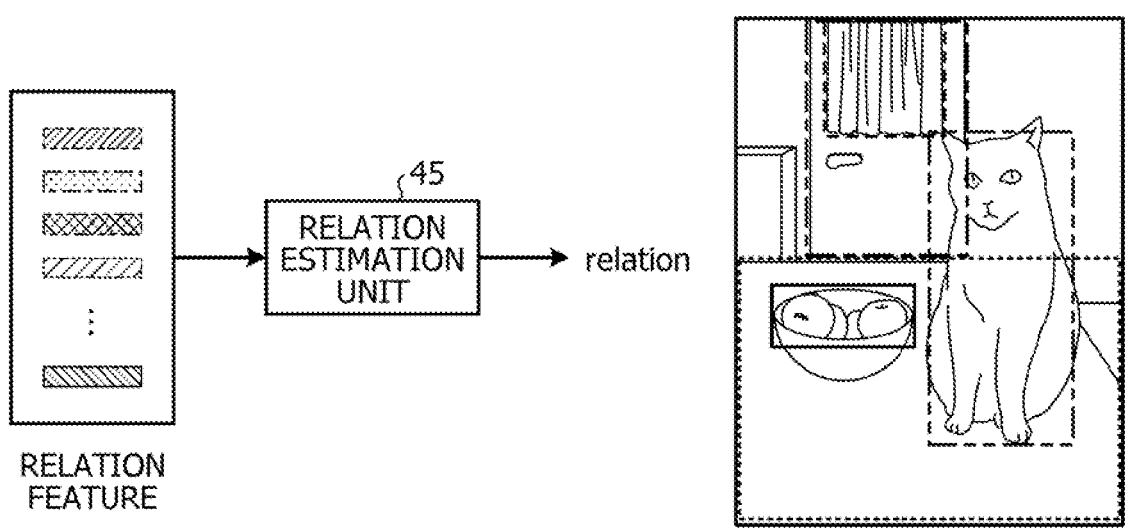
FIG. 11 is a diagram illustrating an example of relation estimation according to Embodiment 1.

Next, estimation of the relation of each pair of the subject and the object to be executed by the relation estimation unit 45 is described. FIG. 11 is a diagram illustrating an example of relation estimation according to Embodiment 1. The relation estimation unit 45 receives the relation feature output by the relation feature extraction unit 44 and outputs the relation corresponding to each pair of the subject and the object. The relation estimation unit 45 may be configured by, for example, an existing technique such as MLP or batch normalization. The relation to be output is the probabilities of the relation to serve as predetermined estimation targets, and, for example, in a case where the estimation targets are {on, behind, hold}, probabilities such as (0.1, 0.9, 0.2) respectively for {on, behind, hold} are output as the relation between the curtain and the cat in the example illustrated in FIG. 11.

In the above description, the relation estimation process that may more accurately recognize the relation between visual entities in an image has been described in more detail with reference to FIGS. 6 to 11. Next, a training process of the NN by which the processing units that execute the estimation process are configured is described. A backpropagation that is an existing technique may be used for the training process of the NN. Although the training process may be executed by the information processing apparatus 10 that is an execution subject of the estimation process, the training process may be executed by an other information processing apparatus. According to the present embodiment, description is made on the assumption that the process is executed by a machine learning apparatus 100 which is the other information processing apparatus.

[Functional Configuration of Machine Learning Apparatus 100]

Figure 12:
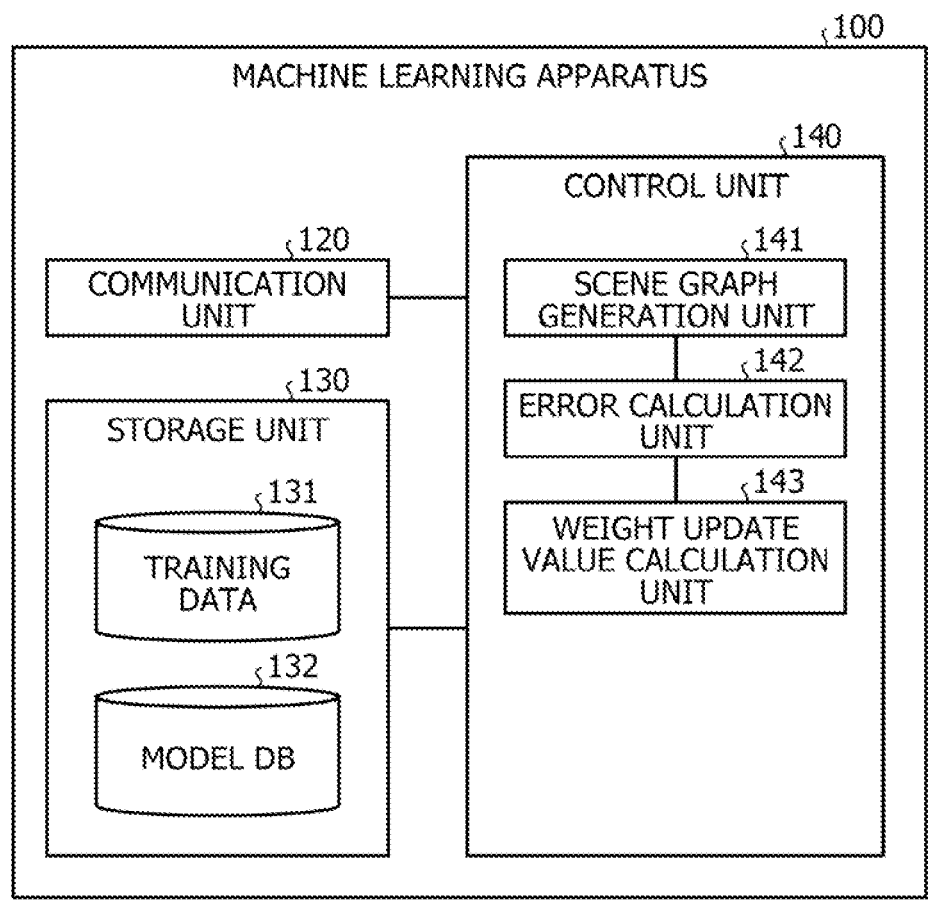
FIG. 12 is a diagram illustrating a configuration example of a machine learning apparatus according to Embodiment 1.

A functional configuration of the machine learning apparatus 100 serving as an execution subject of the training process of the NN is described. FIG. 12 is a diagram illustrating a configuration example of the machine learning apparatus 100 according to Embodiment 1. As illustrated in FIG. 12, the machine learning apparatus 100 includes a communication unit 120, a storage unit 130, and a control unit 140.

The communication unit 120 is a processing unit that controls communication with an other information processing apparatus and is, for example, a communication interface such as a network interface card. The communication unit 120 may transmit and receive information to and from, for example, the information processing apparatus 10.

The storage unit 130 is an example of a storage device that stores various types of data and a program to be executed by the control unit 140, and is, for example, a memory, a hard disk drive, or the like. The storage unit 130 stores training data 131, a model DB 132, and the like.

The training data 131 stores training data in which the captured image is the feature and the locations of the visual entities (BBOXes), the types of the visual entities (classes), and the relation between the visual entities (relation) included in the captured image are the correct answer labels.

The model DB 132 stores, for example, information on the machine learning model for obtaining the types of the visual entities (classes) and the relation between the visual entities (relation) for generating the scene graph from the captured image. The model DB 132 also stores the model parameter for constructing the machine learning model.

The above-described information stored in the storage unit 130 is merely exemplary, and the storage unit 130 may store various types of information other than the above-described information.

The control unit 140 is a processing unit that controls the entirety of the machine learning apparatus 100 and is, for example, a processor or the like. The control unit 140 includes a scene graph generation unit 141, error calculation units 142, and a weight update value calculation unit 143. Here, the scene graph generation unit 141 may be configured by an NN as illustrated in FIG. 6. Each of the processing units is an example of an electronic circuit included in the processor or an example of a process executed by the processor.

Figure 13:
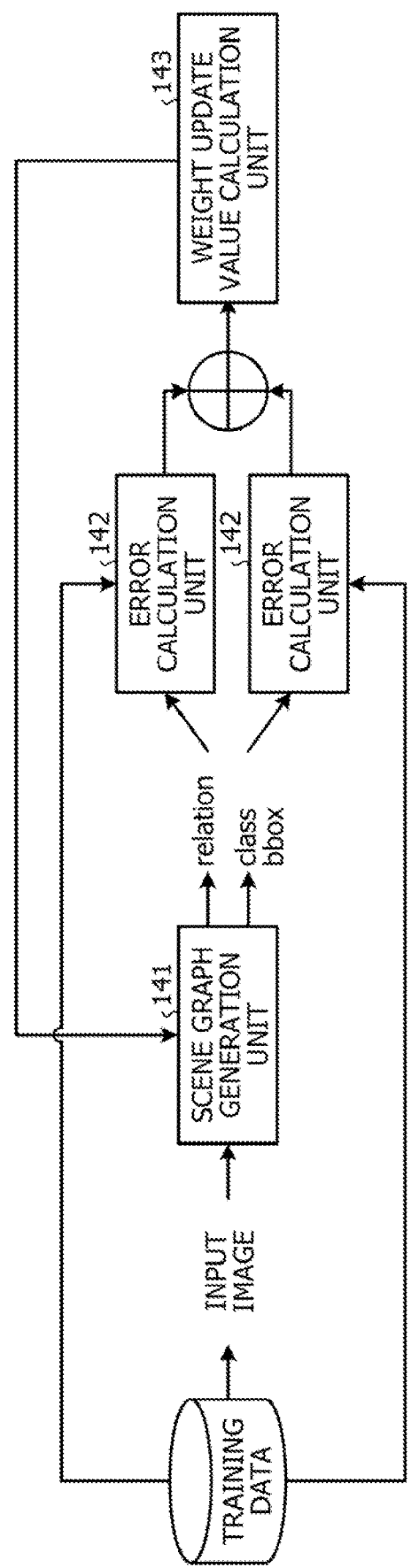
FIG. 13 is a diagram illustrating an example of training of a machine learning model according to Embodiment 1.

A process performed by each processing unit is described with reference to FIG. 13. FIG. 13 is a diagram illustrating an example of training of the machine learning model according to Embodiment 1. As illustrated in FIG. 13, first, the machine learning apparatus 100 inputs an input image obtained from the training data 131 to the scene graph generation unit 141. The input image may be any of images of various landscapes captured by using a camera device, a camera function, or the like. By using an existing technique, the scene graph generation unit 141 detects and outputs the locations of the visual entities (BBOXes), the types of the visual entities (classes), and the relation between the visual entities (relation) from the input image.

Next, by using the error calculation units 142, the machine learning apparatus 100 calculates errors by comparing each of the BBOXes, the classes, and the relation output from the scene graph generation unit 141 with each piece of training data corresponding to the input image, for example, a correct answer label. For example, an existing technique such as cross entropy or class balanced loss may be used for the calculation of the errors.

Next, by using the weight update value calculation unit 143, the machine learning apparatus 100 obtains a total sum of the errors calculated by using the error calculation units 142 and, with this total sum, calculates an update value of the weight of the NN in accordance with the backpropagation. According to the update value of the weight calculated by using the weight update value calculation unit 143, the machine learning apparatus 100 updates the weight of the NN in the scene graph generation unit 141. Thus, according to the present embodiment, training of the NN by which the processing units which execute the relation estimation process that may more accurately recognize the relation between the visual entities in the image are configured is performed. Since the execution subject of the estimation process is the information processing apparatus 10, when the estimation process is executed, for example, the trained NN is copied to the machine learning apparatus 100 in advance and used.

[Flow of Process]

Figure 14:
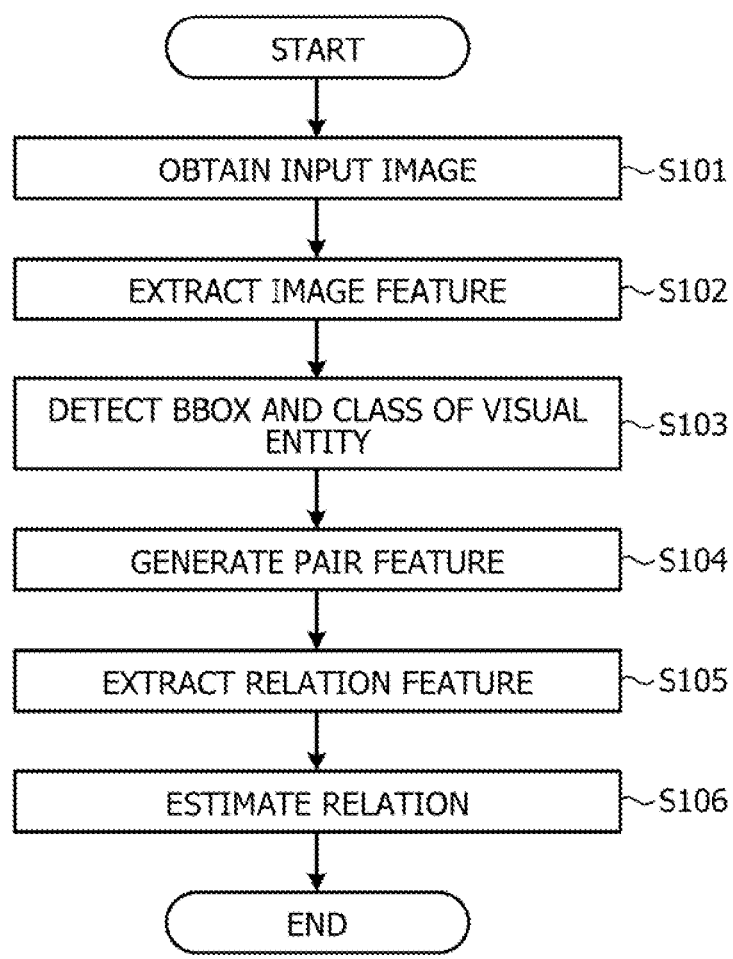
FIG. 14 is a flowchart illustrating an example of a flow of a relation estimation process according to Embodiment 1.

Next, a flow of the relation estimation process by the information processing apparatus 10 is described with reference to FIG. 14. FIG. 14 is a flowchart illustrating an example of the flow of the relation estimation process according to Embodiment 1. The relation estimation process illustrated in FIG. 14 is a process of estimating the relation between visual entities in an image or video from the image or video obtained by capturing a certain scene. The relation estimation process illustrated in FIG. 14 may be started by, for example, being triggered by uploading of a captured image or a video to be processed to the information processing apparatus 10 or may be started at arbitrary timing.

First, the information processing apparatus 10 obtains an input image to be processed from the input data 31 (step S101). The input image includes an image of a single frame of a video. In a case where the input image is stored as a video in the input data 31, a single frame is obtained from the video as the input image.

Next, the information processing apparatus 10 extracts the feature of the image as the image feature from the input image obtained in step S101 (step S102).

Next, the information processing apparatus 10 detects a plurality of visual entities included in the image the feature of which has been extracted in step S102 (step S103). As detection of the visual entities, for example, the BBOXes indicating the locations of respective visual entities included in the image and the classes indicating the types of the respective visual entities are detected by using an existing technique.

Next, as the pair feature, the information processing apparatus 10 generates the second feature in which the visual entities in the combination of the plurality of visual entities detected in step S103 are combined, in first feature, with each other (step S104).

Next, the information processing apparatus 10 generates the attention map from the pair feature extracted in step S104 and extracts the relation feature by synthesizing the pair feature and the feature of the region which is extracted by using the attention map and important for the relation estimation (step S105).

Based on the relation feature extracted in step S105, the information processing apparatus 10 estimates the relation of each visual entity detected from the image (step S106). The estimation of the relation may be, for example, calculation of a probability for each type of the relation. After step S106 has been executed, the relation estimation process illustrated in FIG. 14 ends.

Effects

As described above, the information processing apparatus 10 extracts a first feature from an image, detects, from the extracted first feature, a plurality of visual entities included in the image, generates a second feature in which the visual entities in a combination of the plurality of detected visual entities are combined, in first feature, with each other, generates, based on the first feature and the second feature, a first map that indicates relation of each visual entity, extracts a fourth feature based on the first map and a third feature obtained by converting the first feature, and estimates relation from the fourth feature.

Accordingly, the information processing apparatus 10 estimates relation between the visual entities also in consideration of the image feature of an other visual entity than the visual entities for which the relation is estimated. Thus, the relation between the visual entities in the image may be more accurately recognized.

The estimating of the relation executed by the information processing apparatus 10 includes generating a fifth feature based on the fourth feature and the second feature, and estimating the relation from the fifth feature.

Accordingly, the information processing apparatus 10 may more accurately estimate the relation between the visual entities in the image.

In the generating of the second feature executed by the information processing apparatus 10, the visual entities in each combination of the plurality of detected visual entities are respectively defined as a subject and an object, and the generating of the second feature includes generating the second feature in which the objects in the combination of the subject and the object are combined, in first feature, with each other.

Accordingly, the information processing apparatus 10 may more accurately estimate the relation between the visual entities in the image.

The generating the first map executed by the information processing apparatus 10 includes obtaining correlation between the first feature and the second feature for each combination of the plurality of detected visual entities, and generating the first map based on the correlation.

Accordingly, the information processing apparatus 10 may consider a region important for the estimation of the relation between the visual entities in the image and may more accurately estimate the relation between the visual entities.

The extracting the fourth feature executed by the information processing apparatus 10 includes obtaining a weighted sum by multiplying the third feature by the first map, and extracting the fourth feature based on the weighted sum.

Accordingly, the information processing apparatus 10 may more accurately estimate the relation between the visual entities.

The estimating of the relation executed by the information processing apparatus 10 includes generating a fifth feature by synthesizing the fourth feature and the second feature, calculating a probability of a type of the relation from the fifth feature, and estimating the relation based on the probability.

Accordingly, the information processing apparatus 10 may more accurately recognize the relation between the visual entities in the image.

The machine learning apparatus 100 extracts a first feature from an image, detects, from the extracted first feature, a plurality of visual entities included in the image, generates a second feature in which the visual entities in a combination of the plurality of detected visual entities are combined, in first feature, with each other, generates, based on the first feature and the second feature, a first map that indicates relation of each visual entity, extracts a fourth feature based on the first map and a third feature obtained by converting the first feature, and generates a machine learning model by performing training in which the fourth feature is set as input and a type and the relation of each visual entity are set as correct answer labels.

Accordingly, the machine learning apparatus 100 may generate the machine learning model for more accurately recognizing the relation between the visual entities in the image.

System

Unless otherwise specified, process procedures, control procedures, specific names, and information including various types of data and parameters described above in the document and the drawings may be arbitrarily changed. The specific examples, distributions, numerical values, and so forth described in the embodiment are merely exemplary and may be arbitrarily changed.

Each of the illustrated elements of each of the apparatuses is a functional concept and is not necessarily physically configured as illustrated. For example, specific forms of distribution and integration of each of the apparatuses are not limited to those illustrated. For example, all or part of the apparatus may be configured to be functionally or physically distributed or integrated in arbitrary units depending on various types of loads, usage states, or the like. All or arbitrary part of each process function performed by each apparatus may be realized by a central processing unit (CPU), a graphics processing unit (GPU), and a program to be analyzed and executed by the CPU or the GPU or may be realized as hardware using wired logic.

[Hardware]

Figure 15:
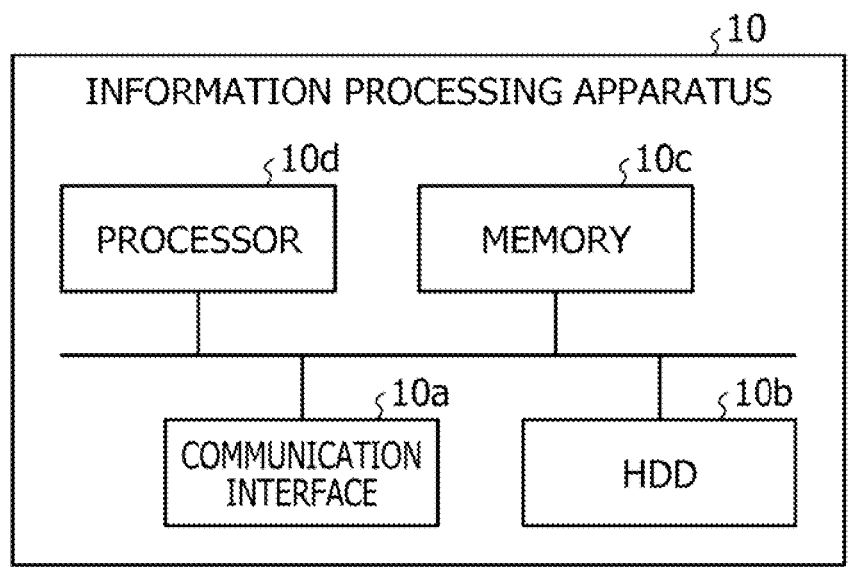
FIG. 15 is a diagram for explaining a hardware configuration example.

FIG. 15 is a diagram for explaining a hardware configuration example. Although the hardware configuration of the information processing apparatus 10 is illustrated in the example of FIG. 15, the machine learning apparatus 100 may also have the same configuration. In the description below, a hardware configuration of the information processing apparatus 10 is described as an example of the information processing apparatus 10.

As illustrated in FIG. 15, the information processing apparatus 10 includes a communication interface 10a, a hard disk drive (HDD) 10b, a memory 10c, and a processor 10d. The components illustrated in FIG. 15 are coupled to each other via a bus or the like.

The communication interface 10a is a network interface card or the like and performs communication with other servers. The HDD 10b stores the DB and the program for operating the functions illustrated in FIG. 5.

The processor 10d is a hardware circuit that reads, from the HDD 10b or the like, the program for executing processes similar to those of the respective processing units illustrated in FIG. 5 and loads the program to the memory 10c to operate a process of executing each of the functions illustrated in FIG. 5 and the like. For example, in this process, functions similar to those of the respective processing units included in the information processing apparatus 10 are executed. For example, the processor 10d reads the program having functions similar to those of the image feature extraction unit 41, the visual entity detection unit 42, and the like from the HDD 10b or the like. The processor 10d executes the process in which processes similar to those of the image feature extraction unit 41, the visual entity detection unit 42, and the like are executed.

As described above, the information processing apparatus 10 operates as an information processing apparatus that executes an operation control process by reading and executing the program that executes the processes similar to those of the respective processing units illustrated in FIG. 5. The information processing apparatus 10 may also realize the functions similar to the functions of the above-described embodiment by reading the program from a recording medium with a medium reading device and executing the read program. The program described in an other embodiment is not limited to a program executed by the information processing apparatus 10. For example, the present embodiment may be similarly applied to the case where an other computer or a server executes the program or the other computer and the server cooperate with each other to execute the program.

The program that executes the processes similar to those of the respective processing units illustrated in FIG. 5 may be distributed through a network such as the Internet. The program may be recorded on a computer-readable recording medium such as a hard disk, a flexible disk (FD), a compact disc read-only memory (CD-ROM), a magneto-optical (MO) disk, or a Digital Versatile Disc (DVD) and may be executed by being read from the recording medium by a computer.

Embodiment 2

While the embodiment of the present disclosure has been described, the present disclosure may be implemented in various different forms other than the above-described embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute a process comprising:
    extracting a first feature from an image;
    detecting, from the extracted first feature, a plurality of visual entities included in the image;
    generating a second feature in which the visual entities in at least one combination of the plurality of detected visual entities are combined, in first feature, with each other;
    generating, based on the first feature and the second feature, a first map that indicates relation of each visual entity;
    extracting a fourth feature based on the first map and a third feature obtained by converting the first feature; and
    estimating the relation from the fourth feature,
    wherein the at least one combination includes a plurality of combinations, wherein the generating of the first map includes:
    converting the first feature using a multilayer-perceptron (MLP);
    obtaining correlation between the converted first feature and the second feature for each combination of the plurality of detected visual entities by calculating a correlation value between a C-dimensional vector of a pixel of the first feature and the second feature which is adjusted to the C-dimensional vector; and
    generating the first map based on the correlation.

2. The non-transitory computer-readable recording medium according to claim 1, wherein the estimating of the relation includes generating a fifth feature based on the fourth feature and the second feature, and estimating the relation from the fifth feature.

3. The non-transitory computer-readable recording medium according to claim 1, wherein the at least one combination includes a plurality of combinations, wherein the visual entities in each combination of the plurality of detected visual entities are respectively defined as a subject and an object, and wherein the generating of the second feature includes generating the second feature in which the visual entities in the combination of the subject and the object are combined, in the first feature, with each other.

4. The non-transitory computer-readable recording medium according to claim 1, wherein the extracting of the fourth feature includes obtaining a weighted sum by multiplying the third feature by the first map, and extracting the fourth feature based on the weighted sum.

5. The non-transitory computer-readable recording medium according to claim 1, wherein the estimating of the relation includes generating a fifth feature by synthesizing the fourth feature and the second feature, calculating a probability of a type of the relation from the fifth feature, and estimating the relation based on the probability.

6. The non-transitory computer-readable recording medium according to claim 1, wherein the process further includes
generating a machine learning model by performing training in which the fourth feature is set as input and a type and the relation of each visual entity are set as correct answer labels.

7. A method of processing information comprising:
extracting a first feature from an image;
detecting, from the extracted first feature, a plurality of visual entities included in the image;
generating a second feature in which the visual entities in at least one combination of the plurality of detected visual entities are combined, in first feature, with each other; generating, based on the first feature and the second feature, a first map that indicates relation of each visual entity;
extracting a fourth feature based on the first map and a third feature obtained by converting the first feature; and
estimating the relation from the fourth feature,
wherein the at least one combination includes a plurality of combinations,
wherein the generating of the first map includes:
converting the first feature using a multilayer-perceptron (MLP);
obtaining correlation between the converted first feature and the second feature for each combination of the plurality of detected visual entities by calculating a correlation value between a C-dimensional vector of a pixel of the first feature and the second feature which is adjusted to the C-dimensional vector; and
generating the first map based on the correlation.

8. The method according to claim 7, wherein the estimating of the relation includes generating a fifth feature based on the fourth feature and the second feature, and estimating the relation from the fifth feature.

9. The method according to claim 7, wherein the at least one combination includes a plurality of combinations, wherein the visual entities in each combination of the plurality of detected visual entities are respectively defined as a subject and an object, and wherein the generating of the second feature includes generating the second feature in which the visual entities in the combination of the subject and the object are combined, in first feature, with each other.

10. The method according to claim 7, wherein the extracting of the fourth feature includes obtaining a weighted sum by multiplying the third feature by the first map, and extracting the fourth feature based on the weighted sum.

11. The method according to claim 7, wherein the estimating of the relation includes generating a fifth feature by synthesizing the fourth feature and the second feature, calculating a probability of a type of the relation from the fifth feature, and estimating the relation based on the probability.

12. An information processing apparatus comprising:
a memory; and
a processor coupled to the memory and configured to:
extract a first feature from an image; detect, from the extracted first feature, a plurality of visual entities included in the image;
generate a second feature in which the visual entities in at least one combination of the plurality of detected visual entities are combined, in first feature, with each other;
generate, based on the first feature and the second feature, a first map that indicates relation of each visual entity;
extract a fourth feature based on the first map and a third feature obtained by converting the first feature; and
estimate the relation from the fourth feature,
wherein the at least one combination includes a plurality of combinations,
wherein the processor is configured to:
convert the first feature using a multilayer-perceptron (MLP);
obtain correlation between the converted first feature and the second feature for each combination of the plurality of detected visual entities by calculating a correlation value between a C-dimensional vector of a pixel of the first feature and the second feature which is adjusted to the C-dimensional vector; and
generate the first map based on the correlation.

13. The information processing apparatus according to claim 12, wherein the processor: generates a fifth feature based on the fourth feature and the second feature, and estimates the relation from the fifth feature.

14. The information processing apparatus according to claim 12, wherein the at least one combination includes a plurality of combinations, wherein the visual entities in each combination of the plurality of detected visual entities are respectively defined as a subject and an object, and wherein the processor generates the second feature in which the visual entities in the combination of the subject and the object are combined, in first feature, with each other.

15. The information processing apparatus according to claim 12, wherein the processor: obtains a weighted sum by multiplying the third feature by the first map, and extracts the fourth feature based on the weighted sum.

16. The information processing apparatus according to claim 12, wherein the processor generates a fifth feature by synthesizing the fourth feature and the second feature, calculates a probability of a type of the relation from the fifth feature, and estimates the relation based on the probability.

* * * * *